3,133,788
PROCESS FOR THE MANUFACTURE OF NIOBIUM PENTOXIDE OR TANTALUM PENTOXIDE
Fritz Kern, Therwil, and Alex Jacob and Peter Cyril Hooper, Basel, Switzerland, assignors to Ciba Limited, Basel, Switzerland, a company of Switzerland
No Drawing. Filed Nov. 29, 1960, Ser. No. 72,320
Claims priority, application Switzerland Dec. 4, 1959
5 Claims. (Cl. 23—21)

This invention relates to the manufacture of the pure pentoxides of niobium and tantalum.

For producing the pentoxides of niobium and tantalum in a highly pure state there are generally used lengthy methods involving the use of non-oxidic compounds of these metals, for example, halogen-compounds, more especially the pentachlorides, because it is considerably easier to carry out the steps necessary for purification with these compounds than with the pentoxides. The purified non-oxidic compounds must be reconverted into the pentoxides, and this is generally carried out by hyhydrolysis. The known process for hydrolysis by direct reaction with water, if desired, with neutralization by means of ammonia, has the disadvantage that the precipitates so obtained are very difficult to filter industrially and the necessary filtering and washing operations therefore entail considerable cost. It is also known to treat a chloride of one of these metals in the vapour phase with water vapour to form the dust-like metal oxide and gaseous hydrogen chloride. This process involves technical difficulties, especially in view of the formation of deposits in the apparatus due to the separation of the fine dust produced.

The present invention provides a process for the manufacture of the pure pentoxide of niobium or tantalum, wherein the pure finely divided solid pentachloride of the metal is treated with water vapour until the evolution of hydrogen chloride is finished.

If desired the pentoxide may thereafter be calcined at a temperature within the range of 700 to 1000° C.

The water vapour may be used in the form of superheated steam or in the form of a gas, for example, air or nitrogen, containing water vapour.

The mixture of gas and water vapour can be produced either by mixing water vapour and gas of suitable temperature in the desired relative proportions, or by passing the gas heated at a suitable temperature through water, whereby the gas becomes charged with water vapour. If desired, the mixture of water vapour and gas may be heated in a heat exchanger to the desired temperature before entering the reaction zone. Superheated steam is produced by heating saturated steam.

In both cases the gas or gaseous mixture that reacts with the solid pentachloride has a temperature above the dew point corresponding to the content of water vapour.

The temperature in the reaction chamber must be kept low enough to prevent the pentachloride passing into the liquid or gaseous state. This would cause the solid particles to agglomerate and would also cause a reaction to take place in the gaseous phase which is undesired. The temperature in the reaction chamber must therefore be below the melting point of the pentachloride. Thus, when as is generally the case the reaction is carried out under atmospheric or only slightly superatmospheric pressure, the temperature should not be higher than about 200° C. As the oxidation reaction is exothermic, the quantity and temperature of the water vapour supplied must be such that the temperature during the reaction is maintained within the aforesaid limits depending on the dew point of the water vapour and the melting point of the pentachloride.

The treatment of the pentachloride with the water vapour may be carried out, for example, in a vessel provided with stirring means which contains the pentachloride into which the water vapour is introduced. The stirring means is so constructed that it continuously scrapes the walls of the vessel and removes any reaction product that settles thereon. An advantageous form of the process is one in which the treatment is carried out in a reaction vessel containing a fluidised bed. The superheated steam is passed through the perforated base of the vessel and causes fluidization of the pentachloride therein. In general, in this case a mixture of water vapour and a gas, for example, air or nitrogen is used in order to achieve satisfactory fluidization of the solid material independently of the quantity of water vapour required for the reaction. By adjusting the proportion of water vapour mixed with the gas, for example, air, or an inert gas, for example, nitrogen, the optimum quantity of gas and gas velocity necessary to produce the fluidized bed can be attained. Simultaneously and independently thereof the temperature in the reaction zone is maintained within the aforesaid temperature limits by controlling the content of water vapour in the gaseous mixture and the temperature of the mixture. This ability to regulate the temperature in the reaction zone by adjusting the temperature and composition of the mixture of water vapour and gas has the further advantage that the exchange of heat energy through the wall of the reaction vessel is unnecessary. The wall of the reaction vessel can therefore be at any desired temperature and the latter therefore can be chosen with regard to other more important conditions of the process. In general the wall of the fluidized bed reactor is maintained at a temperature of about 110 to 120° C., that is is to say, only very slightly above the boiling point of water, in order to prevent the condensation of water vapour on the wall of the vessel. On the other hand the walls of the parts of the apparatus that follow the reaction zone are maintained at a higher temperature of about 200° C., in order to prevent the deposition of the finely powdered oxide.

It is of advantage to incorporate in the fluidized bed, which may consist of the ground pentachloride having a particle size of about 500 microns, a small amount of the pentoxide of the metal in order to improve the flow properties of the fluidized bed and to prevent the sintering of the pentachloride into larger particles.

If desired, the composition of the mixture of water vapour and gas may be periodically or continuously changed during the reaction in order to control the course of the reaction. In general this is accomplished by slowly increasing the content of water vapour. In this manner the duration of the reaction is shortened, without leading to the development of undesirable high reaction temperatures.

The process is generally carried out in a fluidized bed discontinuously. Thus, a given quantity of the pentachloride is introduced at the outset, if desired, in admixture with a small proportion of the pentoxide, and the process is continued until the rate of reaction becomes very small. The pentoxide obtained from the aforesaid reaction, contains a small amount of residual chlorine and water. If desired, the contents of chlorine and water may be further reduced by calcining the powder at 700–1000° C.

This calcination, if desired, is generally carried out in an apparatus communicating with the hydrolysis apparatus, but, if desired, the hydrolysis and calcination may be carried out in the same reaction vessel or fluidized bed by discontinuing the introduction of water vapour when it is desired to carry out the calcination and increasing the temperature of the air to about 700 to 1000° C.

The process of this invention, as compared with the known processes referred to above enables considerably simpler apparatus to be used and yields a loose free-flowing powder. This is due to the fact that in the process of the invention the pentachloride and water vapour are very thoroughly mixed together and brought into intimate contact. Moreover, the reaction product has a considerably coarser particle size than the fine powder which is obtained by the hydrolysis of the pentachloride in the vapour phase with water vapour, and which on account of its fine state of division is extremely difficult to handle and may cause harmful deposits in parts of the apparatus where this is undesirable.

As the final product must generally be anhydrous the hydroxide-containing product resulting from the treatment with water vapour is calcined. During the calcination the content of chloride in the product is reduced to a permissible amount. For some purposes for which the product is to be used calcination may be dispensed with, for example, when the oxide is to be used as a catalyst, for which purposes a reactive material is desirable. Moreover, the product may be dehydrated to a limited extent by drying under accurately controlled conditions, for example, in vacuo.

Accordingly, the process of the invention need not necessarily include the calcination operation, and need involve only the conversion of the pentachloride with water vapour into the pentoxide.

The following examples illustrate the invention, the parts being by weight.

*Example 1*

100 parts of finely ground highly pure tantalum pentachloride were treated in a glass vessel, which was provided with a stirrer that closely scraped the wall of the vessel and was immersed in an oil bath having a temperature of 180° C., with a current of steam superheated to 250° C. for 120 minutes at the rate of 4 parts of steam per minute, while slowly stirring, the steam introduced into the pulverulent mass being stirred. Throughout the whole operation the material remained loose and free flowing.

The pentoxide so obtained was then calcined at 800° C. for 60 minutes. By analysis it was found to have a content of silicon dioxide below 0.01%.

*Example 2*

50 parts of finely ground niobium pentachloride were treated for 120 minutes in the same apparatus and under the same conditions as those described in Example 1. There was obtained a free-flowing product and after being calcined at 800° C. the niobium pentoxide was in the form of a loose white powder, of which the purity corresponded to the purity of the pentachloride used.

*Example 3*

The reactor consisted of a vertical glass tube 13 cm. internal diameter and 100 cm. in length with a porous sintered glass disc fixed at the lower end.

The tube was charged with 3000 grams of tantalum pentachloride having a particle size range of 10 to 1000 microns which had been thoroughly mixed with 300 grams of tantalum pentoxide. A gaseous mixture of nitrogen and water vapour was introduced through the sintered disc in the tube, the gaseous mixture having a temperature of 120° C. and being supplied at the rate of 40 liters of nitrogen per minute and 3 grams of water vapour per minute. The gaseous mixture was produced by passing nitrogen into water, and the relative proportions of nitrogen and water vapour in the mixture were adjusted by heating the water to a corresponding temperature. After one hour the composition of the gaseous mixture was changed to 25 liters of nitrogen per minute and 9 grams of water vapour per minute and the temperature of the mixture was raised to 140° C. After a further 2 hours, the supply of nitrogen was discontinued and water vapour alone at 140° C. was introduced for 1 hour at the rate of 15 grams per minute.

The walls of the reaction vessel were maintained at a temperature of 110 to 130° C., and the upper end of the fluidized bed reactor and the off-take pipe for the reaction gas were maintained at a temperature of about 200° C. The reaction gas was cooled in a counter-current cooler and freed from any entrained oxide by washing with water. This oxide was recovered from the washing water by filtration.

The oxide from the fluidized bed was calcined in a crucible at 900° C. for 6 hours. Thus 1.75 kg. of tantalum pentoxide were obtained in the form of a powder having a particle size range 50–250μ and a chlorine content of 0.01%.

*Example 4*

20 grams of tantalum pentachloride contained in a small quartz vessel were placed in a horizontal quartz tube. The tube was heated to 150° C. and pure steam was introduced until the evolution of hydrogen chloride could no longer be detected. The temperature was then raised to 900° C. and the steam was replaced by air. After calcination for four hours there were obtained 11.5 grams of tantalum pentoxide having a chlorine content of 0.013%.

What is claimed is:
1. Process for making pure pentoxide of metal selected from the group consisting of tantalum and niobium comprising
   (1) contacting finely divided solid pentachlorde of said metal in a fluidized bed within a reaction vessel with water vapor, said fluidized bed being maintained at a temperature between about 120 to 200° C., the walls of said reaction vessel defining the fluidized bed being maintained at a temperature between about 110 to 130° C., whereby metal pentoxide is produced, while concomitantly maintaining the additional wall portions of said vesesl at a temperature of about 200° C., thereby preventing the deposition of powdered pentoxide on said vessel walls, and
   (2) calcining the resultant powdered pentoxide at a temperature of about 700 to 1000° C.
2. Process of claim 1 wherein said finely divided solid pentachloride has a particle size of between 10 and 1000 microns.
3. Process of claim 2 wherein said finely divided solid pentachloride has a particle size of about 500 microns.
4. Process of claim 1 wherein the internal surface of said vessel is continuously scraped with stirring means, to thereby prevent accumulation of pentoxide product on said vessel walls.
5. Process of claim 1 wherein said contacting of step (1) is effected for about 2 hours.

References Cited in the file of this patent
UNITED STATES PATENTS

| | | |
|---|---|---|
| 2,805,921 | Schaumann | Sept. 10, 1957 |
| 3,000,703 | Brugger | Sept. 19, 1961 |

FOREIGN PATENTS

| | | |
|---|---|---|
| 1,094,146 | France | Dec. 1, 1954 |
| 1,028,108 | Germany | Apr. 17, 1958 |
| 583,038 | Canada | Sept. 8, 1959 |

OTHER REFERENCES

Chem. and Eng. News, vol. 38, No. 27, July 4, 1960.
Mellor: "Comprehensive Treatise on Inorganic and Theoretical Chemistry," Longmans, Green and Co., New York, vol. 9, pages 860, 877 and 920 (1929).
May et al.: Industrial and Engineering Chemistry, vol. 46, No. 12, pages 2495–2500 (pages 2496, 2497 and 2500 particularly relied on), December 1954.